Figure 1:
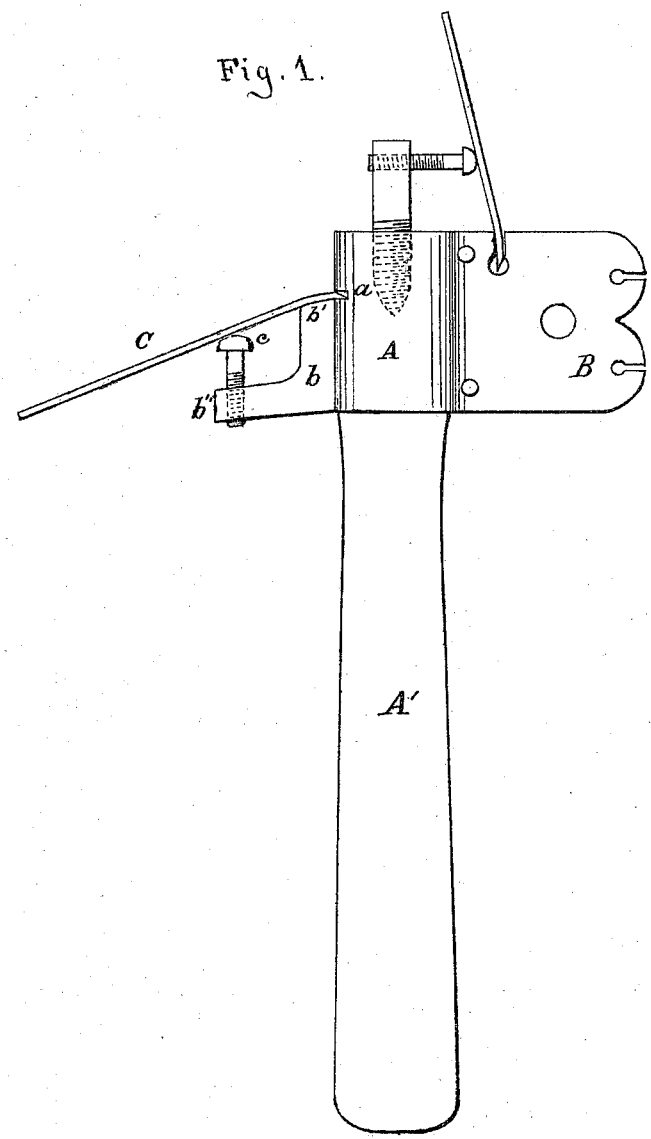

J. E. EMERSON.
Improvement in Saw-Sets.

No. 128,718. Patented July 9, 1872.

Witnesses:

Inventor:

UNITED STATES PATENT OFFICE.

JAMES E. EMERSON, OF BEAVER FALLS, PENNSYLVANIA.

IMPROVEMENT IN SAW-SETS.

Specification forming part of Letters Patent No. 128,718, dated July 9, 1872.

I, JAMES E. EMERSON, of Beaver Falls, in the county of Beaver, in the State of Pennsylvania, have made certain Improvements in Saw-Sets, of which the following is a specification:

This invention consists in the construction of the saw-set and its adaptation to be used with a detachable saw-handle, as will be more fully hereinafter specified.

In the drawing, A represents the common strap-socket, with handle A' and wings B B, which socket and handle may be attached to the blade of a cross-cut or other saw by any of the well-known means whereby such socket and handle become removable at will. $a$ is a shallow transverse slot cut into the outside of the body of the socket. $b$ is an anvil-block fast upon the socket A, with a curved face, $b'$, a nearly horizontal arm, $b''$, extending outward, and has the gauge or setting screw $c$ screwed therein, which is used to determine the amount of set to the teeth. C represents a transverse section of a saw-blade in position, and shows the manner of setting a tooth in said saw-blade. In using cross-cut saws, it is well known that many times the settling down of the timber which is being sawed will contract the kerf cut by the saw, and in doing so the set in the saw-teeth will be taken out, or some portion of it; or when the saw has become dull, or the points of the teeth are worn down by filing, the set is less; consequently the saw will, if the teeth are not set wider, bind in the kerf and work hard; and this generally occurs when the saw is in use and far removed from the usual means for setting it. By this simple invention, as above described, all inconvenience from such circumstances is avoided, as the easily-removed saw-handle from the saw, with the saw-set attached to or formed with or upon the socket of a removable handle, is always at hand to be used as a set whenever the teeth of the saw may need it.

A set for the setting of the teeth of cross-cut saws when thus made with the detachable saw-handle is just as good as any wrench-set for that purpose, is as reliable, and no inconvenience to the sawyer who uses it in cross-cutting timber, and is as durable as the metal socket itself, and makes, when combined with a removable socket of a cross-cut saw, an improvement that is valuable and important.

This saw-handle saw-set is used as follows: Remove the detachable handle from the saw, adjust the gauge-screw $c$ at the position to allow the desired set to the teeth, place the point of a tooth of the saw C into the slot $a$ which is in the socket, then take hold of the handle A' and wrench it toward the saw-blade until the side of the saw-blade touches the outer part of the gauge-screw $c$, which bends the tooth about the circular face $b'$ of block $b$, when the tooth is set. This operation is continued until all the teeth that are to be set in one direction upon that side of the saw are set, when the saw-blade is turned to set the teeth to the opposite side, and when completed the teeth will all be equally set in both directions, and as perfectly done as they could be if a stationary set had been used.

Having thus described my invention, what I claim, and desire to secure by Letters Patent, is—

The removable socket A and handle A' of a cross-cut saw, in combination with the saw-set composed of the slot $a$ in socket A, anvil-block $b$, having arm $b''$, and gauge-screw $c$, when attached and constructed to operate with the handle in the manner substantially as described.

JAMES E. EMERSON.

Witnesses:
J. A. LOWNDES,
DANIEL S. PRATT.